(12) United States Patent
Van Sloun et al.

(10) Patent No.: US 9,309,671 B2
(45) Date of Patent: Apr. 12, 2016

(54) STRUCTURAL PANEL AND METHOD FOR MAKING SAME

(75) Inventors: Jeffrey J. Van Sloun, Perrysburg, OH (US); John F. Budinscak, Jr., Wadsworth, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days.

(21) Appl. No.: 13/409,958

(22) Filed: Mar. 1, 2012

(65) Prior Publication Data

US 2013/0227902 A1 Sep. 5, 2013

(51) Int. Cl.
| | |
|---|---|
| *B32B 37/18* | (2006.01) |
| *B32B 3/26* | (2006.01) |
| *E04C 2/296* | (2006.01) |
| *B32B 5/18* | (2006.01) |
| *B32B 5/32* | (2006.01) |
| *B32B 3/06* | (2006.01) |
| B32B 37/12 | (2006.01) |

(52) U.S. Cl.
CPC . *E04C 2/296* (2013.01); *B32B 3/06* (2013.01); *B32B 5/18* (2013.01); *B32B 5/32* (2013.01); *B32B 37/1284* (2013.01); *B32B 2266/0228* (2013.01); *B32B 2266/0278* (2013.01); *B32B 2266/0285* (2013.01); *B32B 2305/022* (2013.01); *B32B 2307/304* (2013.01); *B32B 2309/105* (2013.01); *B32B 2509/10* (2013.01); *B32B 2607/00* (2013.01); *Y10T 428/24967* (2015.01); *Y10T 428/249981* (2015.04)

(58) Field of Classification Search
CPC ......... E04D 3/351; E04D 3/352; E04D 3/354; E04D 3/355; E04B 2/02; E04B 1/90; E04B 1/80; E04B 1/86; B32B 37/18; B32B 3/702; B32B 3/26; E04C 2/20; E04C 2/38
USPC ............. 52/589.1, 591.1, 581, 580, 412, 409, 52/408, 784.14, 784.15, 794.1, 796.1, 52/309.4, 309.8, 309.9, 309.14, 309.15
See application file for complete search history.

(56) References Cited

U.S. PATENT DOCUMENTS

| | | | | | |
|---|---|---|---|---|---|
| 1,854,396 | A | * | 4/1932 | Davis | 52/483.1 |
| 1,990,656 | A | * | 2/1935 | Kotrbaty | 52/243 |
| 2,856,039 | A | * | 10/1958 | Hawkinson | 52/241 |
| 3,001,613 | A | * | 9/1961 | McBerty | E04B 1/6158 52/580 |
| 3,003,810 | A | * | 10/1961 | Kloote | B62D 33/048 105/422 |
| 3,785,103 | A | * | 1/1974 | Turner | 52/309.11 |
| 3,786,609 | A | * | 1/1974 | Difazio | 52/784.13 |
| 4,004,391 | A | * | 1/1977 | Keeton | 52/591.1 |
| 4,016,697 | A | * | 4/1977 | Ericson | 52/796.1 |
| 4,121,958 | A | | 10/1978 | Koonts | |
| 4,236,366 | A | * | 12/1980 | Rijnders | 52/580 |
| 4,304,080 | A | * | 12/1981 | Freeman | 52/309.9 |
| 4,379,480 | A | * | 4/1983 | Kempel et al. | 160/232 |
| 4,402,167 | A | * | 9/1983 | Denucci | 52/426 |
| 4,435,939 | A | * | 3/1984 | Hird | 52/582.1 |
| 4,518,026 | A | * | 5/1985 | Otto | E06B 3/827 160/201 |
| 4,546,585 | A | * | 10/1985 | Governale | 52/309.11 |
| 4,550,540 | A | * | 11/1985 | Thorn | 52/309.4 |

(Continued)

*Primary Examiner* — Phi A
(74) *Attorney, Agent, or Firm* — Calfee, Halter & Griswold LLP

(57) ABSTRACT

A structural panel includes a rigid foam core, a spray foam on an exterior surface of the rigid foam core, and a first outer skin on the spray foam. The rigid foam core includes a tongue portion along a first longitudinal side face and a groove portion along a second longitudinal side face. A second outer skin is also on the spray foam.

11 Claims, 5 Drawing Sheets

(56) References Cited

U.S. PATENT DOCUMENTS

| | | | |
|---|---|---|---|
| 4,557,970 A * | 12/1985 | Holtrop | B32B 5/32 428/316.6 |
| 4,907,383 A * | 3/1990 | Winter, IV | 52/86 |
| 4,949,518 A * | 8/1990 | Nagel et al. | 52/239 |
| 4,998,396 A * | 3/1991 | Palmersten | 52/588.1 |
| 5,080,950 A * | 1/1992 | Burke | B32B 5/24 428/157 |
| 5,092,095 A * | 3/1992 | Zadok et al. | 52/588.1 |
| 5,214,894 A * | 6/1993 | Glesser-Lott | 52/408 |
| 5,216,861 A * | 6/1993 | Meyerson | 52/586.2 |
| 5,220,760 A | 6/1993 | Dimakis | |
| 5,325,648 A * | 7/1994 | Menard | 52/456 |
| 5,344,700 A * | 9/1994 | McGath et al. | 428/304.4 |
| 5,345,738 A | 9/1994 | Dimakis | |
| 5,369,226 A * | 11/1994 | Griffen | G01G 3/1414 177/211 |
| 5,381,638 A * | 1/1995 | Andersson | 52/592.1 |
| 5,424,118 A * | 6/1995 | McLaughlin | 428/314.8 |
| 5,439,749 A * | 8/1995 | Klasell | B32B 21/04 428/106 |
| 5,679,432 A * | 10/1997 | Holmquest et al. | 428/71 |
| 5,876,813 A | 3/1999 | Bambara et al. | |
| 6,122,879 A * | 9/2000 | Montes | 52/592.1 |
| 6,247,285 B1 * | 6/2001 | Moebus | 52/589.1 |
| 6,279,287 B1 * | 8/2001 | Meadows | E04C 2/296 52/309.9 |
| 6,681,541 B2 * | 1/2004 | Wang Chen | 52/455 |
| 6,834,468 B1 * | 12/2004 | Kroie | 52/590.2 |
| 6,872,673 B2 * | 3/2005 | MacAulay | B29C 44/1228 428/318.4 |
| 6,901,713 B2 * | 6/2005 | Axsom | E04B 1/80 52/309.17 |
| 6,931,809 B1 * | 8/2005 | Brown | E04B 1/762 156/90 |
| D610,714 S * | 2/2010 | Bloom et al. | D25/119 |
| 7,752,822 B2 * | 7/2010 | Minelli | E04C 3/29 52/578 |
| 7,886,501 B2 * | 2/2011 | Bartlett et al. | 52/800.1 |
| 2006/0260237 A1 * | 11/2006 | Griffin | E04C 2/296 52/409 |
| 2008/0148663 A1 | 6/2008 | Peede et al. | |
| 2010/0291370 A1 | 11/2010 | Jones | |

* cited by examiner

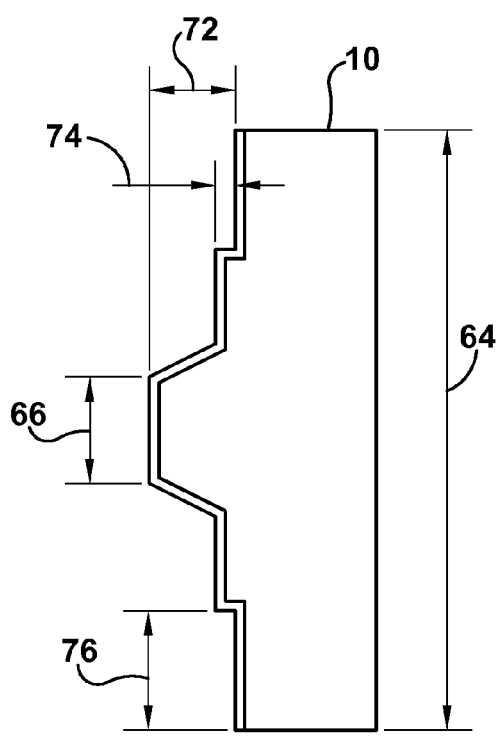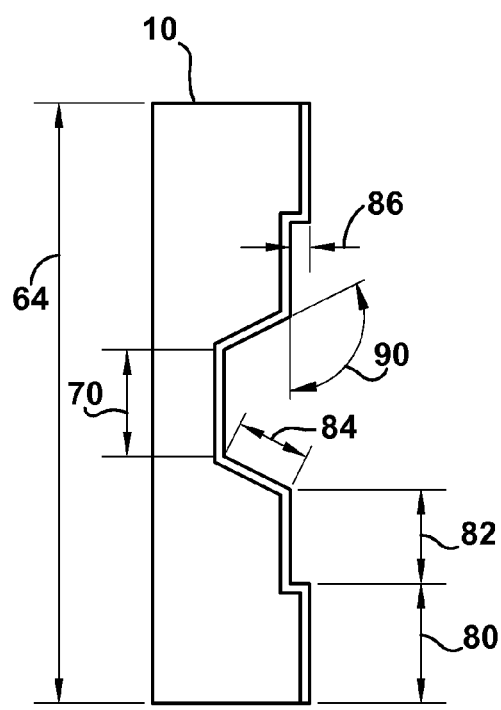

STRUCTURAL PANEL AND METHOD FOR MAKING SAME

BACKGROUND

The present invention relates to composite structural panels, which have structural and insulative properties. It finds particular application in conjunction with insulation panels used for refrigerated coolers, and will be described with particular reference thereto. It will be appreciated, however, that the invention is also amenable to other applications (e.g., cold storage, structural insulated panels (SIPs), or modular panel construction).

Structural insulating panels typically include an insulating core of either a rigid foam or a spray (e.g., liquid) foam. A pair of opposed outer facings are bonded to the panel's insulating core. Rigid foams used in such designs may include extruded polystyrene (XPS), expanded polystyrene (EPS), or polyisocyanurate (ISO). Spray (e.g., liquid) foam used in such designs may include polyurethane (PUR). Spray (e.g., liquid) foam is applied as a liquid or slurry, which cures into a relatively more solid foam after a period of time. It is desirable to maintain the structural insulating panels within a predetermined thickness, while offering custom length and widths.

The present invention provides a new and improved structural insulated panel and method for making same.

SUMMARY

In one aspect of the present invention, it is contemplated that a structural panel includes a rigid foam core, a spray foam on an exterior surface of the rigid foam core, and a first outer skin on the spray foam. The rigid foam core includes a tongue portion along a first longitudinal side face and a groove portion along a second longitudinal side face. A second outer skin is also on the spray foam.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 8 and 9 illustrate exemplary dimensions and an exemplary angle of the panel in accordance with one embodiment illustrating principles of the present invention;

DETAILED DESCRIPTION OF ILLUSTRATED EMBODIMENT

Figure 1:
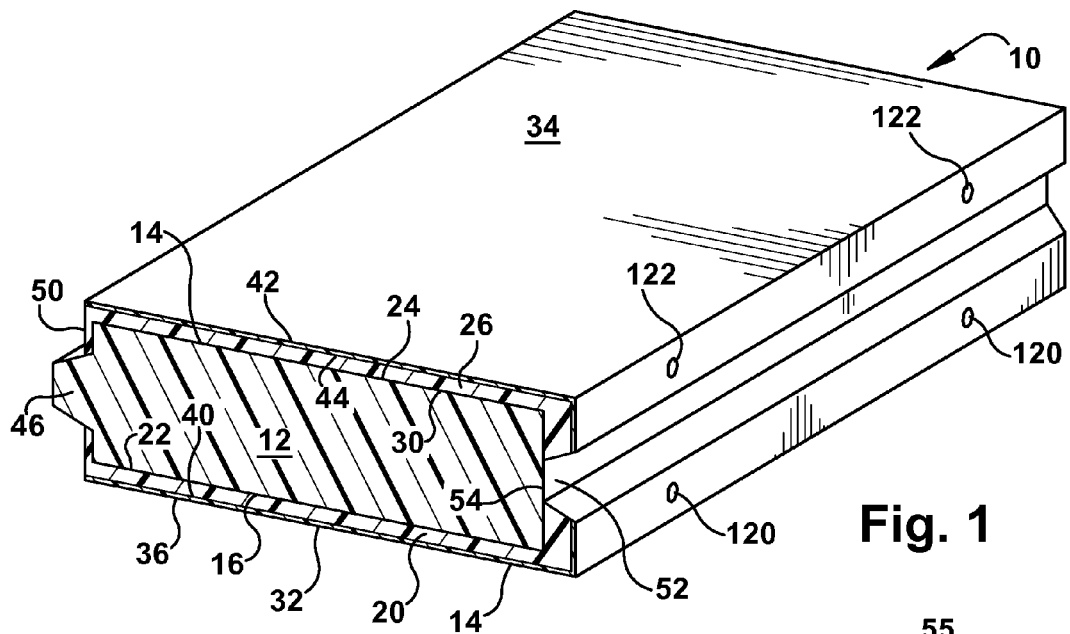
FIG. 1 illustrates a perspective cross-sectional view of a schematic representation of a panel in accordance with one embodiment of an apparatus illustrating principles of the present invention.

With reference to FIG. 1, a simplified perspective cross-sectional view of an exemplary diagram of a structural panel 10 is illustrated in accordance with one embodiment of the present invention. In one embodiment, the panel 10 is an insulating panel.

In the illustrated embodiment, the panel 10 includes a first layer 12 (e.g., a core) of a first material and a second layer 14 of a second material. It is contemplated that the first material is a rigid foam and the second material is a spray foam (e.g., liquid foam that cures into relatively harder foam after a period of time). The rigid foam is selected from the group consisting of extruded polystyrene (XPS), expanded polystyrene (EPS), polyisocyanurate (ISO), polyurethane (PUR), and phenolic and combinations thereof. The spray foam may include, for example, a polyurethane based foam.

The second layer 14 is on the first layer 12. For example, an inner face 16 of a first portion 20 of the second layer 14 is on a first exterior face 22 of the first layer 12. In one embodiment, the second layer 14 covers the first exterior face 22 of the first layer 12. An inner face 24 of a second portion 26 of the second layer 14 is on a second exterior face 30 of the first layer 12. In one embodiment, the second layer 14 covers the second exterior face of the first layer 12. Because the panel 10 includes the first and second layers 12, 14, in one embodiment, the panel 10 is referred to a composite structural panel.

A first outer skin 32 and a second outer skin 34 are on the second layer 14. For example, an inner face 36 of the first outer skin 32 is on an outer face 40 of the first portion 20 of the second layer 14; and an inner face 42 of the outer skin 34 is on an outer face 44 of the second portion 26 of the second layer 14. It is contemplated that the first and/or second outer skins 32, 34, respectively, are sheet material selected from the group consisting of metal (e.g., sheet metal), plastic, and fiber reinforced plastic and combinations thereof.

Figure 2:
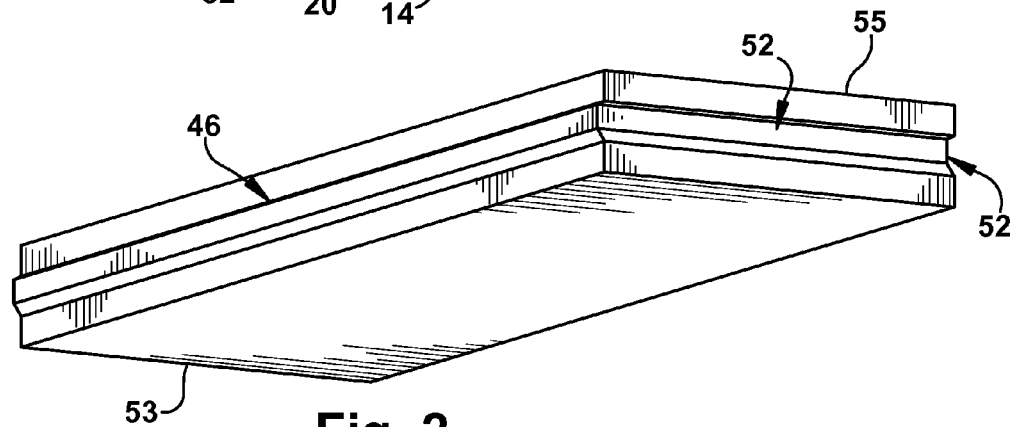
FIG. 2 illustrates a perspective view of a the complete panel of FIG. 1 in accordance with one embodiment of an apparatus illustrating principles of the present invention.

In the illustrated embodiment, the first layer 12 includes a tongue portion 46 along a first side face 50. The first layer 12 also includes a groove portion 52 along a second side face 54. In one embodiment, the first and second side faces 50, 54, respectively, are first and second longitudinal side faces, respectively, of the first layer 12. With reference to FIG. 2, in one example, it is also contemplated that the tongue portion 46 extends along the first side face 50 and along a first end face 53 and that the groove portion 52 extends along the second side face 54 and along a second end face 55.

Figure 3:
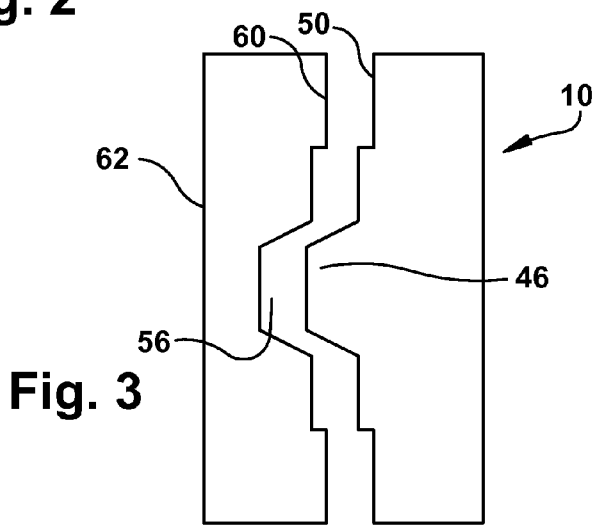
FIG. 3 illustrates a schematic representation of a tongue of the panel matingly cooperating with a groove in an adjacent panel in accordance with one embodiment of an apparatus illustrating principles of the present invention.

As illustrated in FIG. 3, the tongue portion 46 along the first side face 50 of the panel 10 is sized and shaped to matingly cooperate with a groove portion 56 along a second side face 60 of an adjacent structural panel 62. In a similar manner, the groove portion 52 along the second side face 54 of the first layer 12 is sized and shaped to matingly cooperate with a tongue portion along a first side face of another adjacent structural panel. The tongue portion 46 and groove portion 52 are used to matingly secure the panels 10, 62 together.

Figure 4:
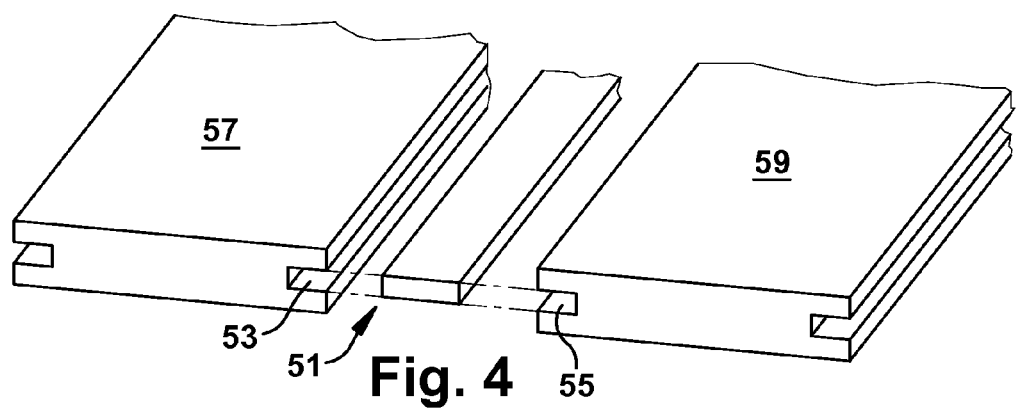
FIGS. 4-7 illustrate alternate embodiments for matingly securing adjacent panels.
Figure 5:
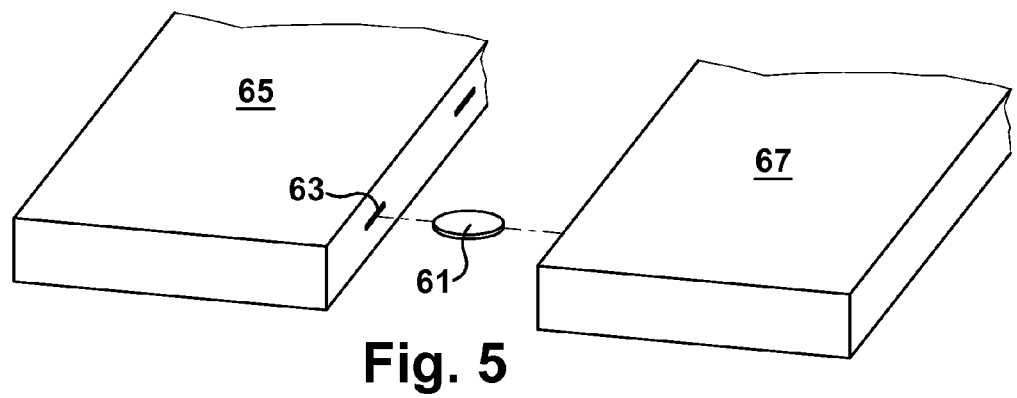
Figure 6:
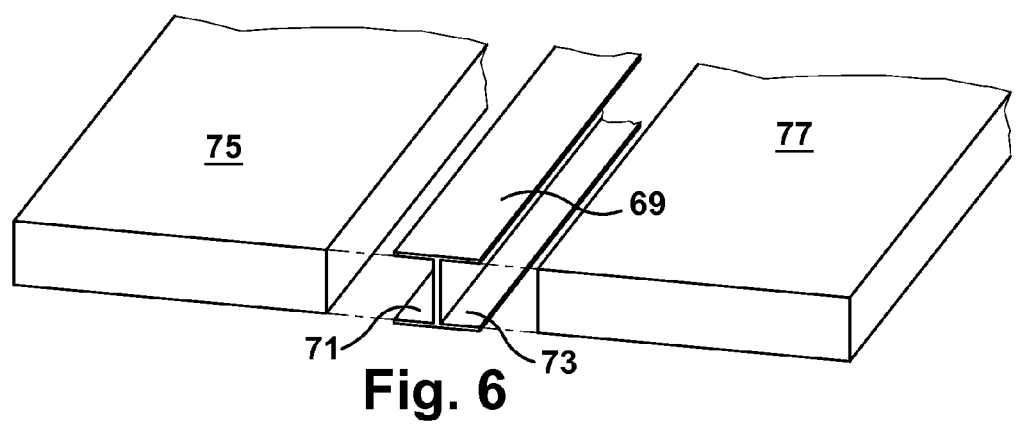
Figure 7:
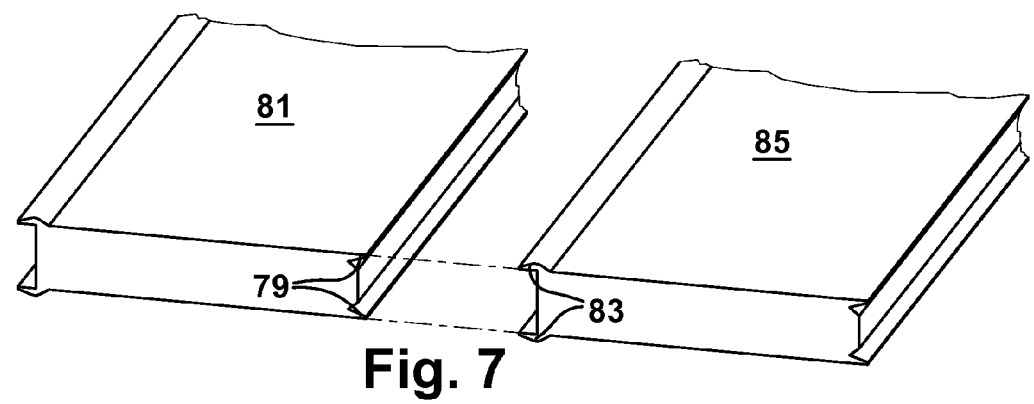

FIGS. 4-7 illustrate alternate embodiments for matingly cooperating (e.g., securing) a first panel with a second panel, which is positioned next to the first panel. FIG. 4 illustrates a spline 51 sized to fit in grooves 53, 55 of respective panels 57, 59. FIG. 5 illustrates a biscuit 61 sized to fit in a recess 63 of panels 65 and another recess (not shown) of panel 67. FIG. 6 illustrates a beam 69 including two (2) channels 71, 73 sized for receiving respective panels 75, 77. FIG. 7 illustrates interlocking flaps 79 of one panel 81 positioned and sized to engage interlocking flaps 83 of another panel 85.

FIGS. 8 and 9 illustrate exemplary dimensions for the panel 10. In the illustrated example, the panel 10 is about 4" thick (see 64). Other illustrated dimensions include 66, which is about ¾"; 70, which is about ¹¹/₁₆"; 72, which is about ⅛"; 74, which is about ⁹/₁₆"; 76, which is about ¹³/₁₆"; 80, which is about ¹³/₁₆"; 82, which is about ⅝"; 84, which is about ½"; and 86, which is about ⅛". An angle 90 is about 117°. It is to be understood that the dimensions and angle illustrated in FIGS. 8 and 9 are merely examples, and that other dimensions and angles are contemplated in other embodiments.

With reference again to FIG. 1, in one embodiment it is contemplated that at least a portion of either or both of the first and second outer skins 32, 34, respectively, covers (and possibly contacts) at least a portion of the first layer 12 and, possibly, at least a portion of the tongue portion 46. For example, the first outer skin 32 may wrap around the outer face 40 of the first portion 20 of the second layer 14 to completely cover (and possibly contact) the first side face 50 of the first layer 12. In that case, the second outer skin 34 may not wrap around from the outer face 44 of the second portion 26 of the second layer 14 and, consequently, not cover any of the first side face 50 of the first layer 12. Alternatively, the second outer skin 34 may wrap around the outer face 44 of the second portion 26 of the second layer 14 to completely cover (and possibly contact) the first side face 50 of the first layer 12. In that case, the first outer skin 32 may not wrap around from the outer face 40 of the first portion 20 of the second layer 14 and, consequently, not cover any of the first side face 50 of the first layer 12. In another embodiment, it is contemplated that neither the first nor second outer skin 32, 34, respectively, covers (or contacts) any of the first side face 50 of the first layer 12 or the tongue portion 46 of the first layer 12. In yet another embodiment, either the first and/or the second outer skin 32, 34, respectively, partially covers (and possibly contact) the first side face 50 and may partially cover (and possibly contacts) the tongue portion 46 of the first layer 12.

It is to be understood that at least a portion of either or both of the first and second outer skins 32, 34, respectively, covers (and possibly contacts) at least a portion of the first layer 12 and, possibly, at least a portion of the groove portion 52. Either or both of the first and second outer skins 32, 34, respectively, covers (and possibly contacts) at least a portion of the first layer 12 and, possibly, at least a portion of the groove portion 52 as discussed above with reference to either or both of the first and second outer skins 32, 34, respectively, covering (partially or fully) (and possibly contacting) the first layer 12 and the tongue portion 46.

It is contemplated that the first layer 12 is about 1 inch to about 5 inches thick, and each of the first and second portions 20, 26 of the second layer 14 is about ⅛ inch to about 1 inch thick. In one embodiment, the first layer 12 is about 3½" thick, and each of the first and second portions 20, 26 of the second layer 14 is about ¼" thick. The total thickness of the first and second layers 12, 14, respectively, is contemplated to be about 1 inch to about 8 inches. Therefore, different embodiments, in which the total thickness is about 2 inches to about 6 inches or about 3 inches to about 5 inches are contemplated. In one embodiment, the total thickness is about 4 inches. However, it is to be understood that other embodiments having different dimensions for the first and second layers 12, 14, respectively, are contemplated.

Figure 10:
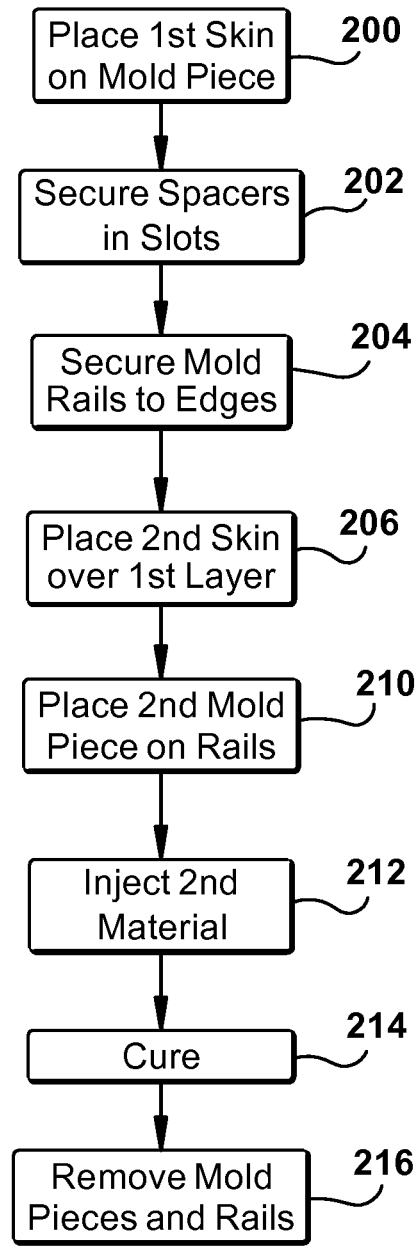
FIG. 10 is an exemplary methodology of making a panel in accordance with one embodiment illustrating principles of the present invention.
Figure 11:
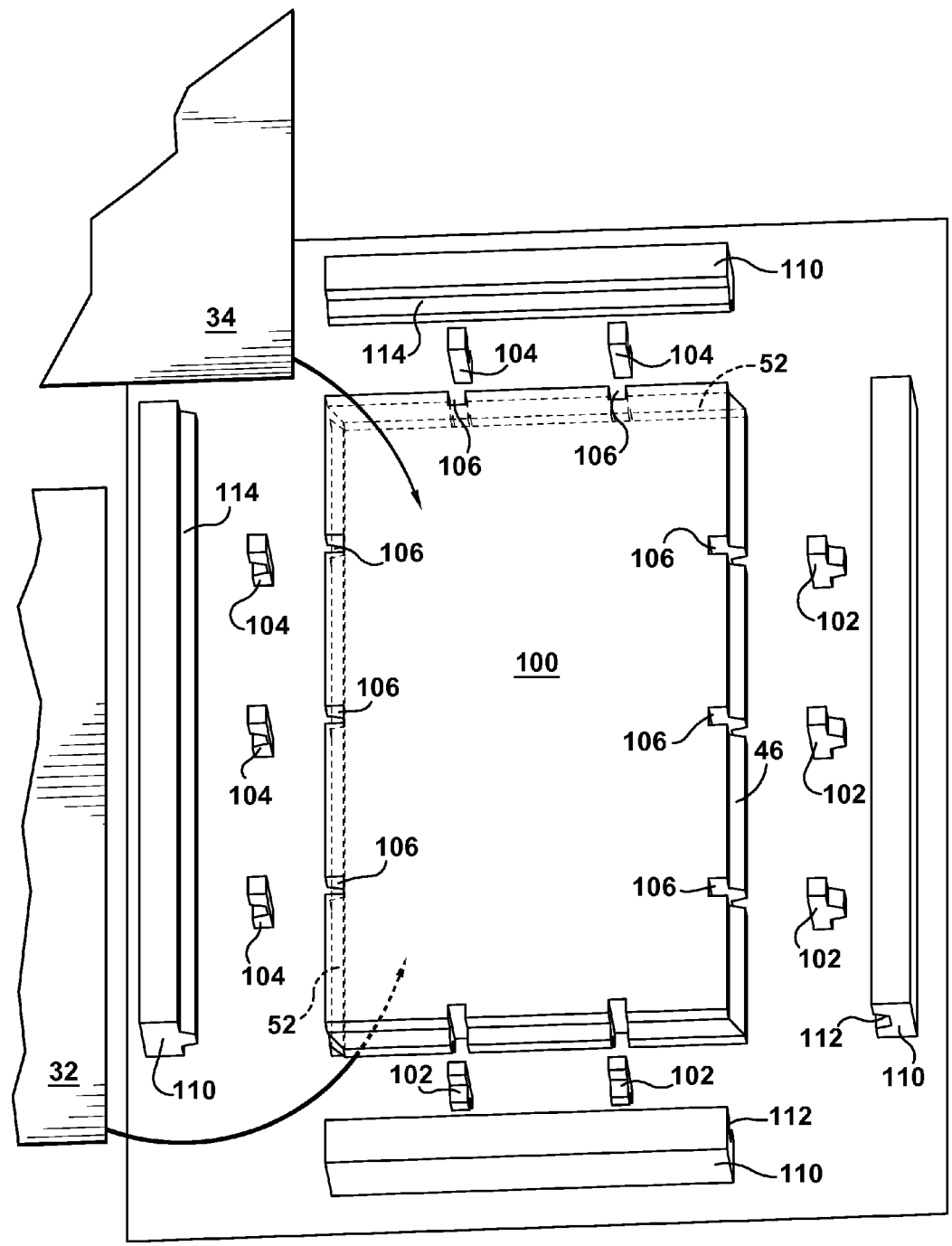
FIG. 11 illustrates a perspective view of a schematic representation of a panel in a mold during assembly in accordance with one embodiment of an apparatus illustrating principles of the present invention.

With reference to FIGS. 1, 10, and 11, a method for making the structural panel 10 includes placing (in a step 200) the first skin 32 on a first (e.g., bottom) mold piece 100. In one embodiment, the bottom mold piece 100 may be a table (e.g., a mold table). In a step 202, male and female spacers 102, 104 (e.g., cam locks), respectively, are secured in slots 106 around edges of the first layer 12. For example, the male spacers 102 are secured in the slots 106 along the edges of the first layer 12 including the tongue 46, and the female spacers 104 are secured in the slots 106 along the edges of the first layer 12 including the groove 52.

In a step 204, mold rails 110 are secured to the edges of the first layer 12 including the male and female spacers 102, 104, respectively. For example, some of the mold rails 110 have a groove 112 that correspondingly matingly engages with the tongue 46 on the respective edges of the first layer 12 and on the male spacers 102; other ones of the mold rails 110 have a tongue 114 that correspondingly matingly engages with the groove 52 on the respective edges of the first layer 12 and on the female spacers 104.

In a step 206, the second skin 34 is placed over the first layer 12 and the spacers 102, 104. In one embodiment, the second skin 34 is placed on the spacers 102, 104. The spacers 102, 104 create a substantially uniform first space between the first skin 32 and the first face 22 of the first layer 12. The spacers 102, 104 also create a substantially uniform second space between the second skin 34 and the second face 30 of the first layer 12. It is contemplated that the uniform first and second spaces are sized to ensure a total thickness between an exterior surface of the first skin 32 and an exterior surface of the second skin 34 is about 4 inches. If the first layer 12 is about 3½" thick, it is contemplated that the substantially uniform first space between the first skin 32 and the first face 22 of the first layer 12 is about ⅛ inch to about 1 inch, and the substantially uniform second space between the second skin 34 and the second face 30 of the first layer 12 is about ⅛ inch to about 1 inch. For example, it is contemplated that the substantially uniform first space between the first skin 32 and the first face 22 of the first layer 12 is about inch to about 1 or about ¼ inch to about ½ inch, and the substantially uniform second space between the second skin 34 and the second face 30 of the first layer 12 is about ¼ inch to about 1 or about ¼ inch to about ½ inch. In one embodiment, it is contemplated that the substantially uniform first space between the first skin 32 and the first face 22 of the first layer 12 is about inch, and the substantially uniform second space between the second skin 34 and the second face of the first layer 12 is about ¼ inch.

In a step 210, a second (e.g., top) mold piece (not illustrated) is placed onto the rails 110.

In a step 212, the second material (e.g., the spray foam) is injected into the substantially uniform first space between the first skin 32 and the first face 22 of the first layer 12 and into the substantially uniform second space between the second skin 34 and the second face 30 of the first layer 12. It is contemplated that the second material is injected via respective first and second orifices 120, 122 in the first and second skins 32, 34. In the illustrated embodiment, the first and second orifices 120, 122 are along longitudinal side faces of the first and second skins 32, 34 (and the first layer 12).

In one embodiment, the second material injected into the substantially uniform first space between the first skin 32 and the first layer 12 is the first portion 20 of the second layer 14 of the panel 10. Similarly, the second material injected into the substantially uniform second space between the first skin 32 and the first layer 12 is the second portion 26 of the second layer 14 of the panel 10.

In accordance with the various embodiments discussed above, the second material may extend from the substantially uniform first and/or second spaces to around the edges of the first layer 12. In one or more embodiment, the second material from the substantially uniform first space may engage the second material from the substantially uniform second space around one or more of the edges of the first layer 12.

The first (e.g., bottom) mold piece 100 offers support to the first skin 32 while the second material (e.g., the spray foam) is injected into the substantially uniform first space between the first skin 32 and the first layer 12. Similarly, the second (e.g., top) mold piece (not illustrated) offers support to the second skin 34 while the second material (e.g., the spray foam) is injected into the substantially uniform second space between the second skin 34 and the first layer 12.

In a step 214, the second material is permitted to cure.

In a step 216, the first (e.g., bottom) mold piece 100, the second (e.g., top) mold piece (not illustrated), and the rails are removed, which results in the completed panel 10.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A structural panel, including:
   a rigid foam core;
   a first spray foam on a first exterior surface of the rigid foam core;
   a second spray foam on a second exterior surface of the rigid foam core;
   a first outer skin on the first spray foam; and
   a second outer skin on the second spray foam;
   wherein the rigid foam core includes a tapered tongue portion along a first side face and the first spray foam and the second spray foam form a tapered groove portion along a second side face of the rigid foam core that is configured to accept the tapered tongue portion, and an entirety of the second side face of the rigid foam core is planar;
   further wherein the rigid foam core is exposed for a length of the first side face and for a length of the second face of the rigid foam core.

2. The structural panel as set forth in claim 1, wherein:
   the tapered tongue portion extends along a first end face of the rigid foam core; and
   the first spray portion and the second spray portion form a tapered groove portion along a second end face of the rigid foam core.

3. The structural panel as set forth in claim 1, wherein:
   the tapered tongue portion along the first side face is sized and shaped to matingly cooperate with a tapered groove portion along a second face of an adjacent structural panel; and
   the tapered groove portion along the second side face is sized and shaped to matingly cooperate with a tapered tongue portion along a first face of an adjacent structural panel.

4. The structural panel as set forth in claim 1, wherein:
   at least one of the first and second outer skins covers at least a portion of the tapered tongue portion and the tapered groove portion.

5. The structural panel as set forth in claim 1, wherein:
   the rigid foam core is about 1 inch to about 5 inches thick;
   the first portion of the spray foam is about ⅛ inch to about 1 inch thick; and
   the second portion of the spray foam is about ⅛ inch to about 1 inch thick.

6. The structural panel as set forth in claim 1, wherein:
   the first outer skin is selected from the group consisting of metal, plastic, and fiber reinforced plastic and combinations thereof; and
   the second outer skin is selected from the group consisting of metal, plastic, and fiber reinforced plastic and combinations thereof.

7. A composite insulative structural panel, including:
   a rigid foam core including a tapered tongue portion along a first longitudinal side face and having a second longitudinal side face which is planar;
   a spray foam on an exterior surface of the rigid foam core and having an extension portion along at least a portion of the first longitudinal side face of the rigid foam core and at least two extension portions along the second longitudinal face of the rigid foam core to define a tapered groove portion that is configured to accept the tapered tongue portion; and
   an outer skin around the spray foam;
   wherein the rigid foam core is exposed for a length of a first side face and for a length of a second face of the rigid foam core.

8. The composite insulative structural panel as set forth in claim 7, wherein:
   the outer skin extends into the tapered groove; and
   the outer skin contacts the rigid foam core in the tapered groove.

9. The structural panel as set forth in claim 1, wherein:
   the rigid foam core is selected from the group consisting of extruded polystyrene, expanded polystyrene, polyisocyanurate, polyurethane, and phenolic and combinations thereof; and
   the spray foam is polyurethane based.

10. A structural panel, including:
    a rigid foam core having a top face, a bottom face, first longitudinal face, a first side face, a second longitudinal face and a second side face;
    a first spray foam covering at least the top face and a second spray foam covering at least the bottom face; and
    a first outer skin covering at least a portion of the first spray foam and a second outer skin covering at least a portion of the second spray foam;
    wherein the rigid foam core includes a tapered tongue portion along at least the first side face, a tapered groove portion along the second side face, and the rigid foam core is exposed for a length of the first side face;
    wherein the tapered groove portion along the second side face is configured to accept the tapered tongue portion along the first side face;
    wherein the tapered groove portion along the second side face is formed by the first spray foam and the second spray foam;
    further wherein the second longitudinal face and the second side face of the rigid foam core are planar.

11. The structural panel as set forth in claim 10, wherein the rigid foam core is extruded polystyrene and the spray foam is polyurethane based.

* * * * *